(No Model.)  2 Sheets—Sheet 1.
E. A. SPERRY.
CONTROLLER FOR ELECTRIC RAILWAY CARS.
No. 565,939.  Patented Aug. 18, 1896.
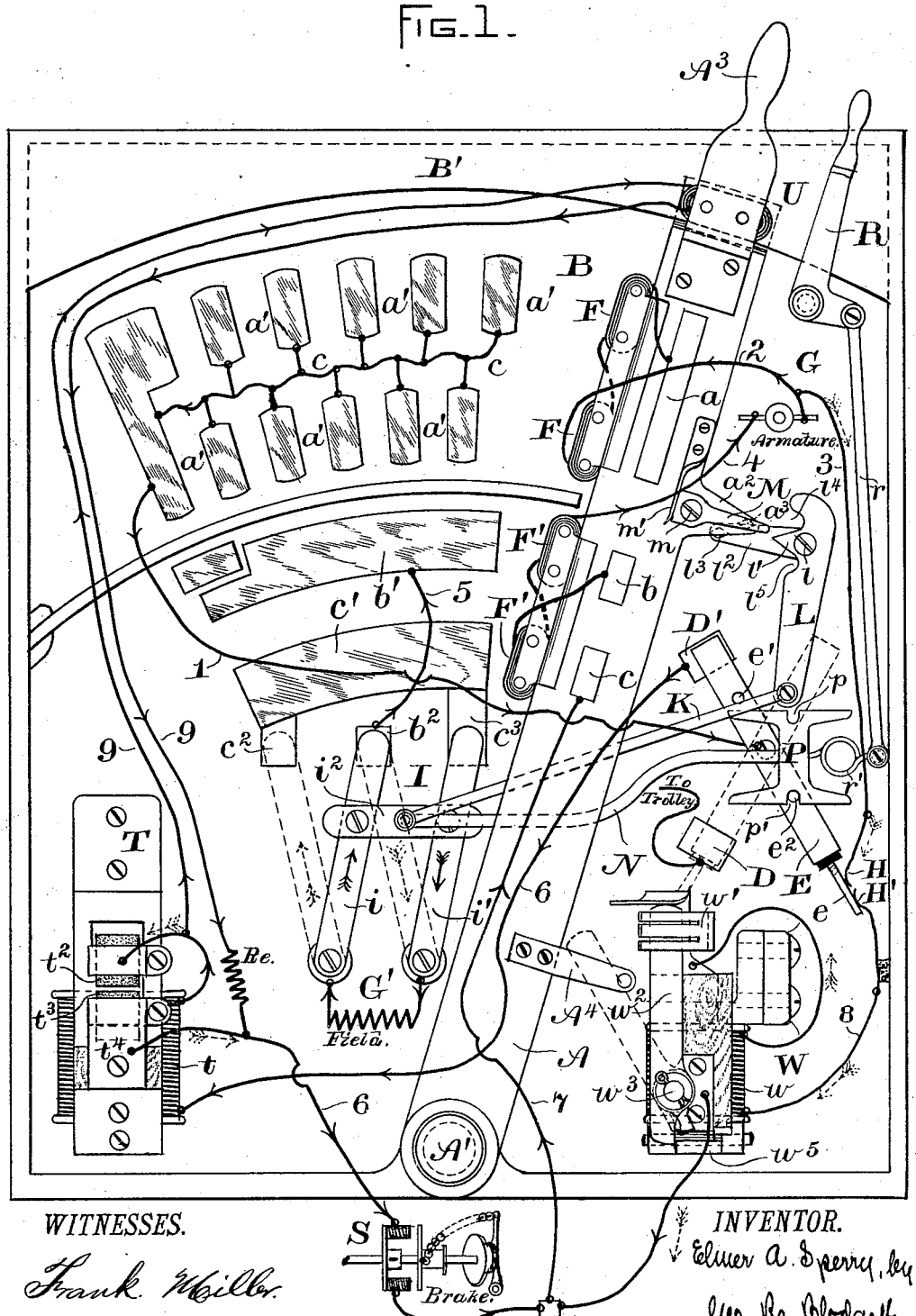
WITNESSES.  
Frank Miller  
A. F. Macdonald
INVENTOR.  
Elmer A. Sperry, by  
Geo. R. Blodgett,  
Atty.

(No Model.) 2 Sheets—Sheet 2.
E. A. SPERRY.
CONTROLLER FOR ELECTRIC RAILWAY CARS.
No. 565,939. Patented Aug. 18, 1896.
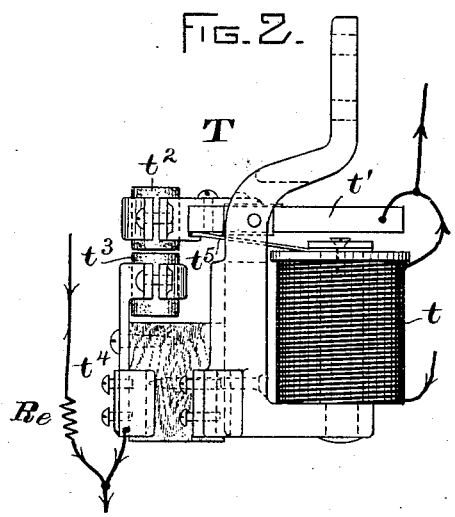
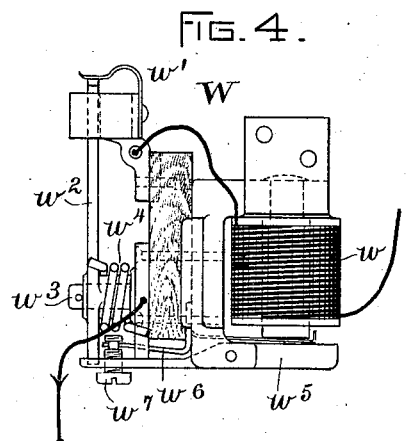
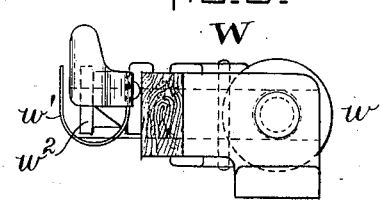
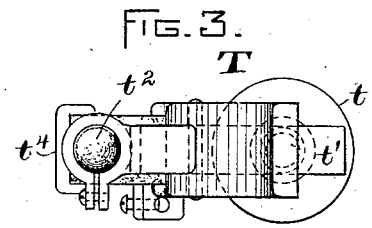
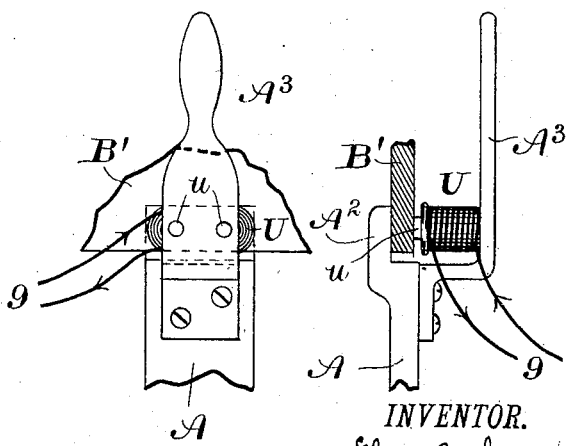
WITNESSES.
B B Hill
A. J. Macdonald
INVENTOR.
Elmer A. Sperry by
Geo. R. Blodgett
atty.

UNITED STATES PATENT OFFICE.

ELMER A. SPERRY, OF CLEVELAND, OHIO, ASSIGNOR TO THE GENERAL ELECTRIC COMPANY, OF NEW YORK.

CONTROLLER FOR ELECTRIC-RAILWAY CARS.

SPECIFICATION forming part of Letters Patent No. 565,939, dated August 18, 1896.

Application filed April 23, 1896. Serial No. 588,721. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Controllers for Electric-Railway Cars, of which the following is a specification.

My invention relates to devices for controlling electrically-propelled vehicles where the electric motors are capable of being converted into generators of electric current for energizing electric brakes or the like. This is generally accomplished by changing the motor connections, so that it operates in a closed circuit which includes the brake mechanism, the relation of the field and armature coils being reversed in order to avoid cutting down the residual magnetism of the field-cores.

The objects of the present invention are, first, to insure a predetermined amount of field excitation before the brakes are placed in circuit; second, to provide means for automatically interrupting this circuit when the current reaches a predetermined strength; third, to provide positive means for automatically locking the controller-handle when the current flowing in the braking-circuit becomes too great.

In the accompanying drawings, Figure 1 is an elevation of a controller, showing the circuit connections. Fig. 2 is a side elevation of the automatic circuit-interrupter controlling the magnetic lock. Fig. 3 is a plan of the same. Fig. 4 is a side elevation of the device for interrupting the shunt-generator circuit. Fig. 5 is a plan view of the same. Fig. 6 is a front elevation of the magnetic lock. Fig. 7 is a side elevation of the same.

The general construction and arrangement are similar to that set forth in my Patent No. 535,511, dated March 12, 1895.

The lever A is pivoted at its lower end to the back plate B at the point A' and carries the contact-plates $a$ $b$ $c$ to coöperate with the contact-plates $a'$ $b'$ $c'$ on the back plate. The series of plates $a'$ are connected through resistances C.

The trolley or other traveling contact is connected with a contact-plate D, adapted to coact with a switch-lever E, which is permanently connected by a conductor 1 with the last of the series of plates $a'$.

The plate $a$ is in circuit with blow-out magnets F, mounted on the lever A, and with one brush of the motor G by means of the conductor 2. A branch conductor 3 runs to a contact-spring H. The gap between this and adjacent contact-spring H' is adapted to be closed by an insulated metallic plate $e$ on one end of the switch-lever E when the switch is thrown open to break the power-circuit. The other brush of the motor G is connected by the conductor 4 with the coils of the blow-out magnets F' and the contact-plate $b$. The plate $b'$ is connected by conductors 5 with the middle one $b^2$ of three contact-plates $c^2$ $b^2$ $c^3$, the plates $c^2$ $c^3$ being connected with the plate $c'$. The plate $c$ on the lever A is grounded.

The field-coil G' of the motor is connected between the two blades $i$ $i'$ of a reversing-switch I, said blades being arranged to coact with the three contacts $c^2$ $b^2$ $c^3$. The blades of the switch are coupled together by a pivoted link $i^2$ of insulation, so as to move simultaneously. A rod K connects this link with a lever L, fulcrumed at $l$ on the back plate B and having a V-shaped lug $l'$.

On the lever A is a finger M, pivoted at $m$, and held yieldingly in a normal position by means of a spring $m'$ bearing against the squared rear end of the finger. Adjacent to the pivoted finger is a rigid arm $a^2$, carrying a diamond-shaped lug $a^3$, which is adapted to coact with a similar lug $l^3$ on an arm $l^2$, integral with the lever L.

When the lever A is thrown to the extreme right, the finger M strikes the V-shaped lug $l'$ and rides along it into one or the other of two adjacent notches $l^4$ $l^5$, depending upon the position of the lever L. In so doing it throws the lever L to its opposite position, and thereby shifts the reversing-switch I. If the lever is not thrown quite far enough, the lug $a^3$ will strike the lug $l^3$ when the lever A is carried back to the left, and the coöperation of these two diamond-shaped lugs, as one slides by the other, will complete the requisite movement of the lever L and the shifting of the switch I. These devices are fully set forth and claimed in my aforesaid application and form no part of the novelty of the present invention. The purpose of the reversing-switch I is to reverse the connections of the field-coil G' of the motor when the switch-lever E is shifted from the power-circuit to the braking position, so as to cause the current generated by the motor to flow through the field-coil in the same direction as the power-current.

The switch-lever E is connected mechanically with the reversing-switch I, so that the movement of the latter shifts the position of the switch-lever E and changes the electrical connections from power to braking.

It will be seen that it is only necessary to throw the lever A to the extreme right in order to effect this change, so that every alternate throw of said lever puts on the power and the intermediate throws set the brake.

In order to provide for running the car in either direction, the connection between the reversing-switch I and the switch-lever E is made by means of a rod N and a double hook P, fastened thereto, the hook being an I-shaped block with notches $p$ $p'$ in its top and bottom to engage with pins $e'$ or $e^2$ in the switch-lever E. The block is shown in Fig. 1 with its bottom notch $p'$ engaging the pin $e^2$, the switch-lever being thrown to the position for setting the brake. By moving the lever A to the right and shifting the reversing-switch the switch-lever E will be moved to the position shown in dotted lines and the motor will be placed in circuit with the trolley.

To reverse the direction of the car, the block P must be raised to disengage the notch $p'$ and engage the notch $p$ with the pin $e'$. The power-circuit will then be closed when the reversing-switch is in the position in which it appears in full lines in Fig. 1. The block P can be raised and lowered by means of an elbow-lever R, connected by a rod $r$ and spring $r'$ with the block.

With the connections as shown in Fig. 1 the current generated by the armature G passes by conductor 2, plate $a$, plates $a'$, and conductor 1 to the switch-lever E, thence by contact-plate D' and conductor 6 to the magnets S of the electric brake, and thence to ground. The other brush of the motor is connected by conductor 4, plates $b$ $b'$, conductor 5, plate $b^2$, blade $i$, field-coil G', blade $i'$, plates $c^3$ $c$, and conductor 7 to ground. The shunt-circuit from the motor goes through conductor 3, contact-spring H, plate $e$, spring H', and conductors 8 to ground.

By swinging the lever A to the left the strength of the braking-current will be increased as the resistances C are successively cut out. The purpose of the present invention is to automatically arrest the movement of the lever and prevent any more increase in the current as soon as it reaches a predetermined strength, so as to avoid any danger of sliding the wheels. To this end I interpose in the brake-circuit an automatic circuit-breaker, and arrange a magnetic lock on the lever A in shunt around the circuit-breaker. I also interpose in the shunt-circuit 3 8 of the motor an automatic circuit-breaker, which can only be reset by a movement of the lever to the right, and a consequent releasing of the brakes.

The circuit-breaker in the brake-circuit is shown at T, Fig. 1, and in Figs. 2 and 3. The electromagnet-coil $t$ is in series with the brake-magnets, the circuit being from the coil $t$ to the pivoted armature $t'$, carbon contacts $t^2$ $t^3$, and insulated plate $t^4$. A spring $t^5$ holds the contacts normally closed.

The magnetic lock for the lever A is shown at U, Fig. 1, and in Figs. 6 and 7. The back plate B has a smooth quadrant B' across its upper end, concentric with the pivot of the lever A. A lip $A^2$ on the lever rides behind the quadrant. The handle $A^3$ carries an electromagnet U, whose cores $u$ lie close to the front of the quadrant. The coils of the electromagnet are in shunt to the contacts $t^2$ $t^3$ of the circuit-breaker T by means of the conductors 9.

The circuit-breaker for the shunt-circuit of the motor is shown at W, Fig. 1, and in Figs. 4 and 5. This consists of a helix $w$, connected with spring-contacts $w'$, coacting with a movable contact-blade $w^2$, pivoted on a stud $w^3$ and having a spring $w^4$ tending to throw it away from the spring-contacts. The armature $w^5$ acts as a detent to hold the contacts closed by engaging with the lower end of the blade $w^2$. A flat spring $w^6$, having a tension-adjusting screw $w^7$, keeps the armature in engagement with the blade. The circuit is through the contacts $w'$ $w^2$ to ground. This circuit-breaker is located near the lever A, so that when the movable blade $w^2$ has been thrown open by its spring a finger $A^4$ on the lever will push it back to a closed position when the lever A is moved to the right.

The operation of these devices is as follows: With the parts as shown in Fig. 1 the first movement of the lever A to the left closes the braking-circuits; but the great resistance of the rheostats C causes most of the currents generated by the motor to flow through the shunt-circuit by way of the circuit-breaker W. As soon as the field strength has become built up to a predetermined point the armature $w^5$ is attracted, releasing the movable blade $w^2$, which flies open and breaks the shunt-circuit, sending all the current through the brake-circuit proper. As the lever A moves to the left the current energizes the brake-magnets S more and more strongly until, at a predetermined point, the armature of the circuit-breaker T is attracted, separating the contacts $t^2$ $t^3$ and sending the entire current through the locking-helix U. The effect of energizing this helix is to cause the cores to act powerfully upon the quadrant B', thereby locking the lever fast until the current diminishes sufficiently to allow the spring $t^5$ to close the contacts $t^2$ $t^3$ again and thus cut out the locking-helix.

Having thus described my invention, what I claim, and desire to secure by Letters Patent, is—

1. In a controller the combination with its operating-handle, of connections for closing the motor in a local circuit, brake-magnets in said circuit, an automatic circuit-breaker in series with the brake-magnets, and a shunt-circuit including an automatic circuit-breaker, substantially as described.

2. In a controller, the combination with its operating-handle, of connections for closing the motor in a local circuit, brake-magnets in said circuit, an automatic circuit-breaker in series with said brake-magnets, a shunt-circuit around the contacts of the circuit-breaker, and a locking-helix for the lever in said shunt-circuit, substantially as described.

3. In a controller, the combination with its operating-handle, of connections for closing the motor in a local circuit, brake-magnets in said circuit, a shunt-circuit around the brake-circuit, automatic circuit-breakers in the brake-circuit and the shunt-circuit, a shunt-circuit around the circuit-breaker in the brake-circuit, and an electromagnetic lock for the lever included in said last-mentioned shunt-circuit, substantially as described.

4. In a controller, the combination with a back plate having a quadrant secured thereto, of an operating-lever having an electromagnet mounted thereon and moving therewith to engage with said quadrant and lock the lever at any point thereon, substantially as described.

5. In a controller, the combination with a back plate having a quadrant secured thereto, of an operating-lever provided with a lip riding behind said quadrant, and an electromagnet mounted on said lever in front of said quadrant, substantially as described.

6. In a controller having circuit connections for an electric brake, the combination with said circuit of an automatic circuit-breaker, consisting of a helix in series with the brake-magnets, a pivoted armature carrying a contact, a stationary contact coacting therewith, and a spring holding said contacts normally closed, substantially as described.

7. In a controller having circuit connections for an electric brake, and a shunt-circuit around said brake-circuit, the combination with said shunt-circuit, of a switch-arm to automatically close the shunt-circuit when the brake is put on and an automatic circuit-breaker for the shunt-circuit consisting of a normally-closed switch, a helix having an armature acting as a detent to hold the switch closed, and a spring to open the switch when the armature is attracted by the helix, substantially as described.

8. In a controller, a circuit-breaker consisting of the helix $w$, the stationary contact $w'$, the pivoted switch-arm $w^2$, the spring $w^4$ acting upon the switch-arm, the armature $w^5$ normally engaging with the end of the switch-arm, and the adjustable spring $w^6$ to keep the armature in engagement, substantially as described.

9. In a controller, having circuit connections with an electric brake and a shunt-circuit around said brake-circuit, the combination with said shunt-circuit, of an automatic circuit-breaker, and means for reclosing said circuit-breaker when the brakes are released, substantially as described.

10. In a controller, the combination with an automatic circuit-breaker having a spring-actuated switch-arm, of an operating-lever having a finger adapted to close said switch-arm, when the lever is moved to release the brakes, substantially as described.

ELMER A. SPERRY.

Witnesses:
M. NIELSON,
P. A. YOUNG.